(12) United States Patent
Yoda et al.

(10) Patent No.: US 7,991,876 B2
(45) Date of Patent: Aug. 2, 2011

(54) MANAGEMENT OF MONITORING SESSIONS BETWEEN MONITORING CLIENTS AND MONITORING TARGET SERVER

(75) Inventors: Kunikazu Yoda, Kanagawa-ken (JP); Takayuki Kushida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 11/612,927

(22) Filed: Dec. 19, 2006

(65) Prior Publication Data
US 2008/0147845 A1 Jun. 19, 2008

(51) Int. Cl.
*G06F 15/173* (2006.01)
(52) U.S. Cl. ............ 709/224; 726/23; 370/352
(58) Field of Classification Search .......... 709/224, 709/227, 228
See application file for complete search history.

(56) References Cited

U.S. PATENT DOCUMENTS

| | | | | |
|---|---|---|---|---|
| 5,907,685 | A * | 5/1999 | Douceur | 709/248 |
| 6,006,269 | A * | 12/1999 | Phaal | 709/227 |
| 6,067,580 | A * | 5/2000 | Aman et al. | 719/330 |
| 6,088,737 | A * | 7/2000 | Yano et al. | 709/235 |
| 6,182,227 | B1 * | 1/2001 | Blair et al. | 726/5 |
| 2002/0078164 | A1 * | 6/2002 | Reinschmidt | 709/217 |
| 2004/0073937 | A1 * | 4/2004 | Williams | 725/107 |
| 2006/0130124 | A1 * | 6/2006 | Richardson et al. | 726/3 |
| 2007/0026854 | A1 * | 2/2007 | Nath et al. | 455/423 |
| 2007/0198656 | A1 * | 8/2007 | Mazzaferri et al. | 709/218 |
| 2008/0147845 | A1 * | 6/2008 | Yoda et al. | 709/224 |

OTHER PUBLICATIONS

J. Wei et al., "Load balancing on the Internet," Internet Encyclopedia, John Wiley & Sons (2004).
T. Kushida et al., "Distributed measurement system for the end-to-end network performance using a dynamic job management," Asia-Pacific Network Operations and Management Symposium (APNOMS) (2005) (presentation).

\* cited by examiner

*Primary Examiner* — Jude J Jean Gilles
*Assistant Examiner* — Jaren M Means
(74) *Attorney, Agent, or Firm* — Vazken Alexanian

(57) ABSTRACT

A system includes a monitoring management server, a monitoring target server, and one or more monitoring clients. The management server determines monitoring parameters for each client. The monitoring parameters specify at least when a client is to begin a monitoring session with the target server and when the client is to end the session with the target server. The management server determines the monitoring parameters for each client such that a predetermined maximum number of monitoring sessions performed within each time period is never exceeded by the target server. Each client receives monitoring parameters from the management server in response to a request initiated by the client, initiates a monitoring session with the target server in accordance with the monitoring parameters, and reports results of the monitoring session to the management server upon the monitoring session ending.

17 Claims, 4 Drawing Sheets

FIG 4
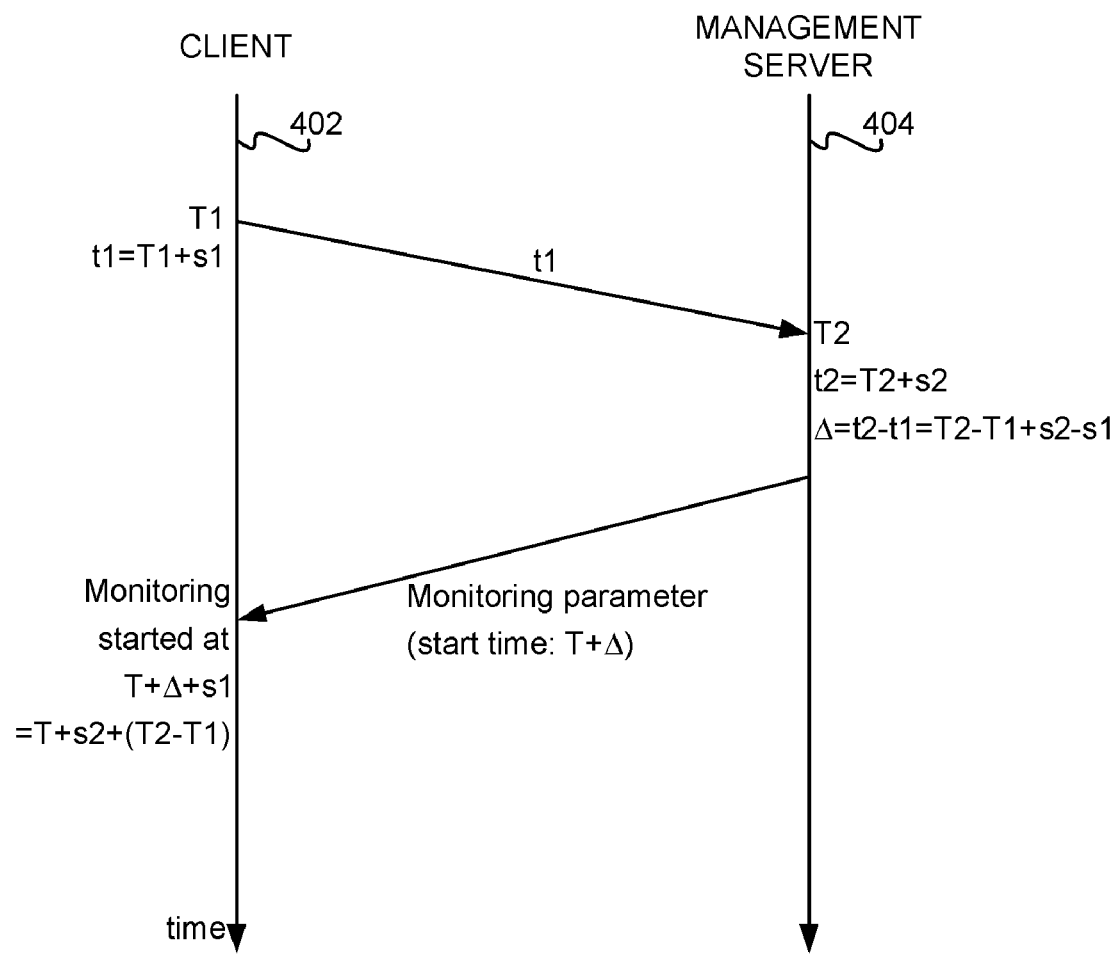
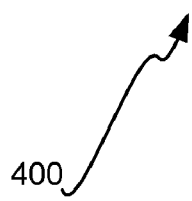

MANAGEMENT OF MONITORING SESSIONS BETWEEN MONITORING CLIENTS AND MONITORING TARGET SERVER

FIELD OF THE INVENTION

The present invention relates generally to monitoring sessions initiated by monitoring clients with a monitoring target server, and more specifically to the management of such monitoring sessions by a monitoring management server.

BACKGROUND OF THE INVENTION

Network performance has become an important issue with applications migrating to the Internet. Network performance can be generally described as the performance of data communications over a network, such as the latency and throughput of a network connection in accordance with one or more particular protocols. For example, a client may periodically connect with a target server and communicate data with that target server. The communication of this data is measured, for latency, throughput, and other factors, to determine the network performance of the client in relation to the server.

Many types of monitoring are performed by client initiation, instead of server initiation. This is particularly the case where ordinary personal computers (PC's) are employed as the clients. PC's may be behind firewalls, such that monitoring sessions with them cannot be initiated by servers. The PC's may also not be turned on all the time such that monitoring sessions with them cannot be initiated by servers. As a result, the common scenario is one or more clients initiating at various times monitoring sessions with a target server.

However, two particular problems may results in this common scenario. First, the target server may not be able to handle all the incoming monitoring sessions initiated by clients. For example, there may be a large number of clients. If by coincidence a large percentage of these clients all attempt to initiate monitoring sessions with the target server during the same period of time, the target server may become overloaded. The result is that the monitoring sessions are not performed correctly. A limited solution is to turn away some of the clients—i.e., have the target server refuse monitoring sessions initiated by some of the clients—but this can be inconvenient to the users of the clients.

Second, even if the clients know a priori to only initiate monitoring sessions at certain times. However, the clocks of various clients may not be set correctly, such that monitoring sessions are not initiated with the target server at the times expected by the target server. Various protocols, such as the network time protocol (NTP), and the simple network time protocol (SNTP), can be employed to ensure that the clients' clocks are properly synchronized. However, doing so adds complexity to the monitoring process, and can be difficult to have the clients achieve.

For these and other reasons, therefore, there is a need for the present invention.

SUMMARY OF THE INVENTION

The present invention relates generally to managing monitoring sessions between monitoring clients and a monitoring target server. A system of one embodiment of the invention includes a monitoring management server, a monitoring target server, and one or more monitoring clients. The management server determines monitoring parameters for each client. The monitoring parameters specify at least when a client is to begin a monitoring session with the target server and when the client is to end the session with the target server. The management server determines the monitoring parameters for each client such that a predetermined maximum number of monitoring sessions performed within each time period is never exceeded by the target server. Each client receives monitoring parameters from the management server in response to a request initiated by the client, initiates a monitoring session with the target server in accordance with the monitoring parameters, and reports results of the monitoring session to the management server upon the monitoring session ending.

A method of one embodiment of the invention is performed by a monitoring client. The monitoring client requests monitoring parameters from a monitoring management server. The parameters specify at least when the client is to begin a monitoring session with a monitoring target server and when the client is to end the monitoring session. The monitoring client receives the monitoring parameters from the management server. The client then initiates the monitoring session with the monitoring target server in accordance with the monitoring parameters received.

A method of another embodiment of the invention is performed by a monitoring management server. The management server determines a maximum number of monitoring sessions that are performable within each time period by a monitoring target server. The management server receives requests for monitoring parameters from monitoring clients in accordance with which the clients are to initiate monitoring sessions with the monitoring target server. The monitoring management server determines the monitoring parameters for each monitoring client such that the maximum number of monitoring sessions is never exceed by the monitoring target server. The management server then sends these monitoring parameters to the clients.

Embodiments of the invention provide for advantages over the prior art. First, monitoring clients do not overload the monitoring target server, because they initiate monitoring sessions with the target server in accordance with monitoring parameters received from the monitoring management server. The monitoring management server provides these monitoring parameters to the clients so that, for instance, the maximum number of monitoring sessions that the monitoring target server can accommodate in each time period is never exceeded.

Second, in some embodiments, the monitoring client sends to the monitoring management server its local time when requesting monitoring parameters. The server uses this local time when determining the monitoring parameters for the client, such as on the basis of the time difference between the local time of the client and the local time of the server. As such, the client receives monitoring parameters that are specifically related to its own local time, and does not have to change its local time, as is required in NTP and SNTP, for instance.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a timing diagram of representative performance of monitoring management, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

General Embodiment

Figure 1:
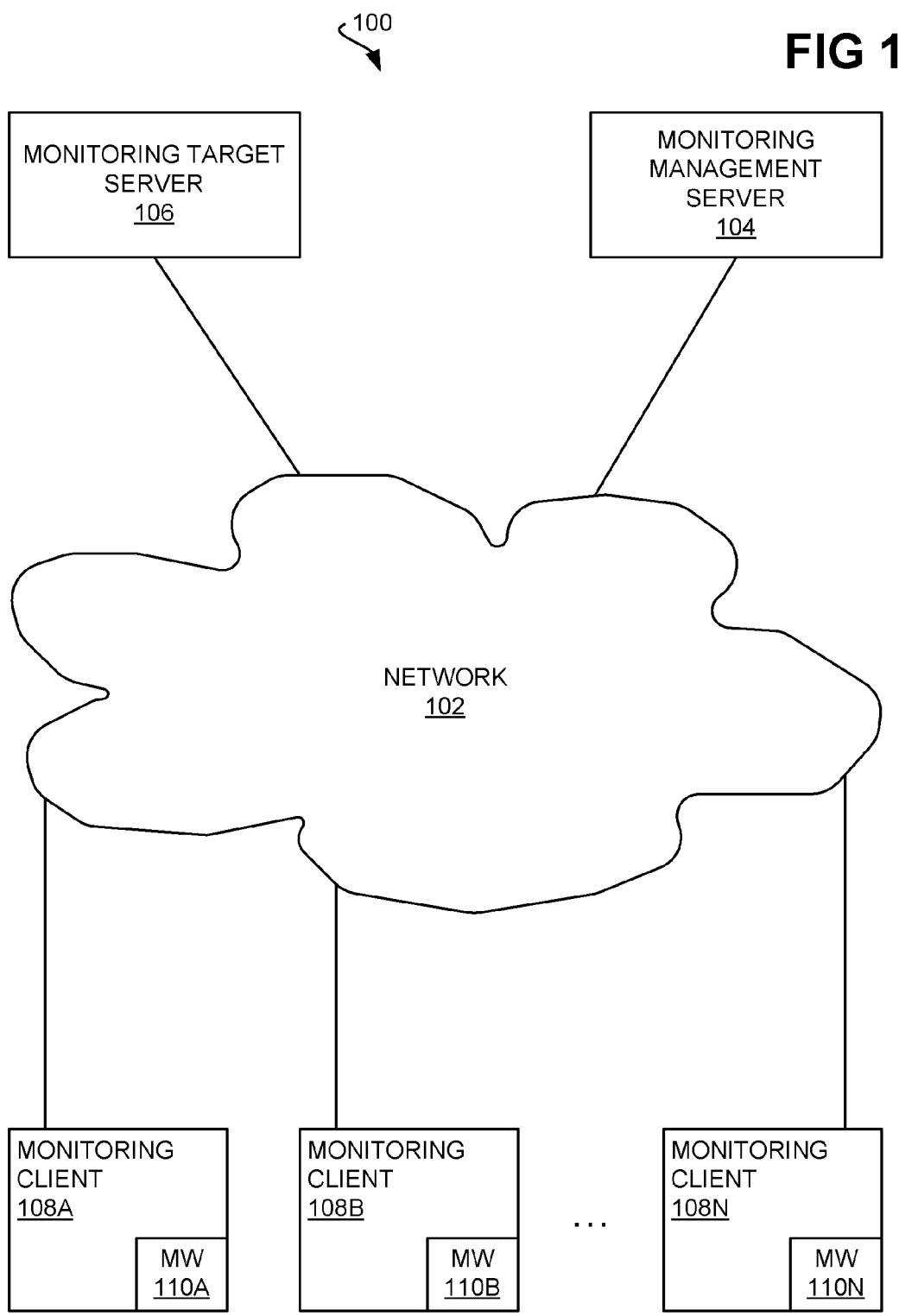
FIG. 1 is a diagram of a system within which monitoring management is performed, according to an embodiment of the invention.

FIG. 1 shows a system 100, according to an embodiment of the invention. The system 100 includes a network 102, to which are communicatively connected a monitoring management server 104, a monitoring target server 106, and monitoring clients 108A, 108B, ..., 108N, collectively referred to as the monitoring clients 108. The network 102 may be or include local-area networks (LAN's), wide-area networks (WAN's), intranets, extranets, and the Internet, among other types of networks. The servers 104 and 106 and the clients 108 are typically computing devices. The servers 104 and 106 are different servers. The monitoring clients 108 have middleware 110A, 110B, ..., 110N, collectively referred to as the middleware 110, installed thereon.

The functionality of the system 100 is described in relation to the monitoring client 108A as representative of each of the monitoring clients 108. The monitoring client 108A issues a monitoring request to the monitoring management server 104. If this is the first time the monitoring client 108A has issued such a request, the monitoring management server 104 replies with the middleware 110A, which is installed at the client 108A. Thereafter, the monitoring client 108A issues monitoring requests via the middleware 110A, and the monitoring functionality ascribed to the monitoring client 108A can in at least some embodiments be performed by the middleware 110A.

The monitoring client 108A thus issues a monitoring to the monitoring management server 104. In response, the monitoring management server 104 determines monitoring parameters for the monitoring client 108A. The monitoring parameters specify when the monitoring client 108A is to begin a monitoring session with the monitoring target server 106, and when the client 108A is to end the monitoring session with the target server 106. The parameters may further specify the type of monitoring that is to be performed. Different types of monitoring include user datagram protocol (UDP) throughput monitoring, in which the UDP protocol is employed to determine the upload and/or download speeds between the client 108A and the server 106. Another, similar type of monitoring includes transmission control protocol (TCP) throughput monitoring, in which the TCP protocol is employed to determine the upload and/or download speeds between the client 108A and the server 106.

The monitoring target server 106 has a predetermined maximum number of monitoring sessions that can be performed within each of a number of time periods. Beyond the maximum number, the performance of the monitoring target server 106 can degrade, such that inaccurate monitoring can result. The predetermined maximum number of monitoring sessions for the target server 106 is specified by a user at the monitoring management server 104 (that is, the server 104 may permit this maximum number of sessions to be specified by a user, such as an administrator), or may be dynamically determined by the management server 104 without user intervention by appropriately measuring the performance of the target server 106.

Therefore, the monitoring management server 104 determines monitoring parameters for the monitoring client 108A such that when the monitoring client 108A initiates a monitoring session with the monitoring target server 106, the maximum number of monitoring sessions for the target server 106 is not exceeded. For instance, the management server 104 keeps track of what monitoring parameters it has already issued to the monitoring clients 108, so that the server 104 knows in any given period of time how many monitoring sessions will be initiated with the target server 106. The monitoring parameters may further include the network address of the monitoring target server 106, which is especially useful where there is more than one such server 106, so that the monitoring client 108A knows which target server to initiate a session with.

Furthermore, when the monitoring client 108A makes a request for monitoring parameters to the monitoring management server 104, the client 108A may provide its current local time to the server 104, as specified by the local clock of the client 108. The monitoring management server 104 when determining the monitoring parameters, such as the start and stop time of a monitoring session, provides these monitoring parameters back to the monitoring client 108A in relation to the local clock of the client 108. In this way, the client 108A initiates a monitoring session with the monitoring target server 106 in relation to the monitoring parameters that adhere to its local clock, and does not have to have its time synchronized with the server 104 and/or the server 106. The difference in the local time of the client 108A between when the client 108A reports the local time to the server 104 and when the server 104 actually receives it does not matter for purposes of embodiments of the invention.

For example, the monitoring client 108A may have a local time of t, whereas the monitoring management server 104 may have a local time of T. The server 104 may determine that the client 108A is to start a monitoring session with the monitoring target server 106 at time A in relation to time T, and end the session at time B in relation to time T. Rather than reporting back monitoring parameters including the times A and B to the client 108A, however, the server 104 reports back monitoring parameters including the times A+(T−t) and B+(T−t). As such, the client 108A receives monitoring parameters that are with respect to its own local time t, as opposed to the local time T of the management server 104.

The monitoring target server 106 may have a number of different attributes in various embodiments of the invention. First, the monitoring target server 106 may have no software installed thereon that is related to the monitoring management performed by the monitoring management server 104. For example, the target server 106 may be a standard web or file transport protocol (FTP) server that cannot have special management software installed thereon. Such special management software may include load-distribution software, such that the target server 106 has no built-in load-distribution functionality in relation to the monitoring sessions initiated by the clients 108.

Second, the monitoring target server 106 may be unaware that the monitoring management server 104 is managing monitoring sessions initiated therewith by the monitoring clients 108. For example, the monitoring target server 106 may not be able to refuse monitoring sessions initiated with it. In this respect, the target server 106 can be unaware that the monitoring management server 104 is instructing the monitoring clients 108 when and for how long to establish monitoring sessions with the target server 106. The monitoring management server 104 knows about and is aware of the monitoring target server 106, but not vice-versa.

In one embodiment, once the monitoring client 108A has initiated and finished a monitoring session with the monitoring target server 106, it reports the results of this monitoring session to the monitoring management server 104. At that time, the monitoring management server 104 may determine new monitoring parameters for the monitoring client 108A and send them to the client 108A. Upon receipt of these new monitoring parameters, the monitoring client 108A initiates a new monitoring session with the monitoring target server 106, and the process is repeated.

Figure 2:
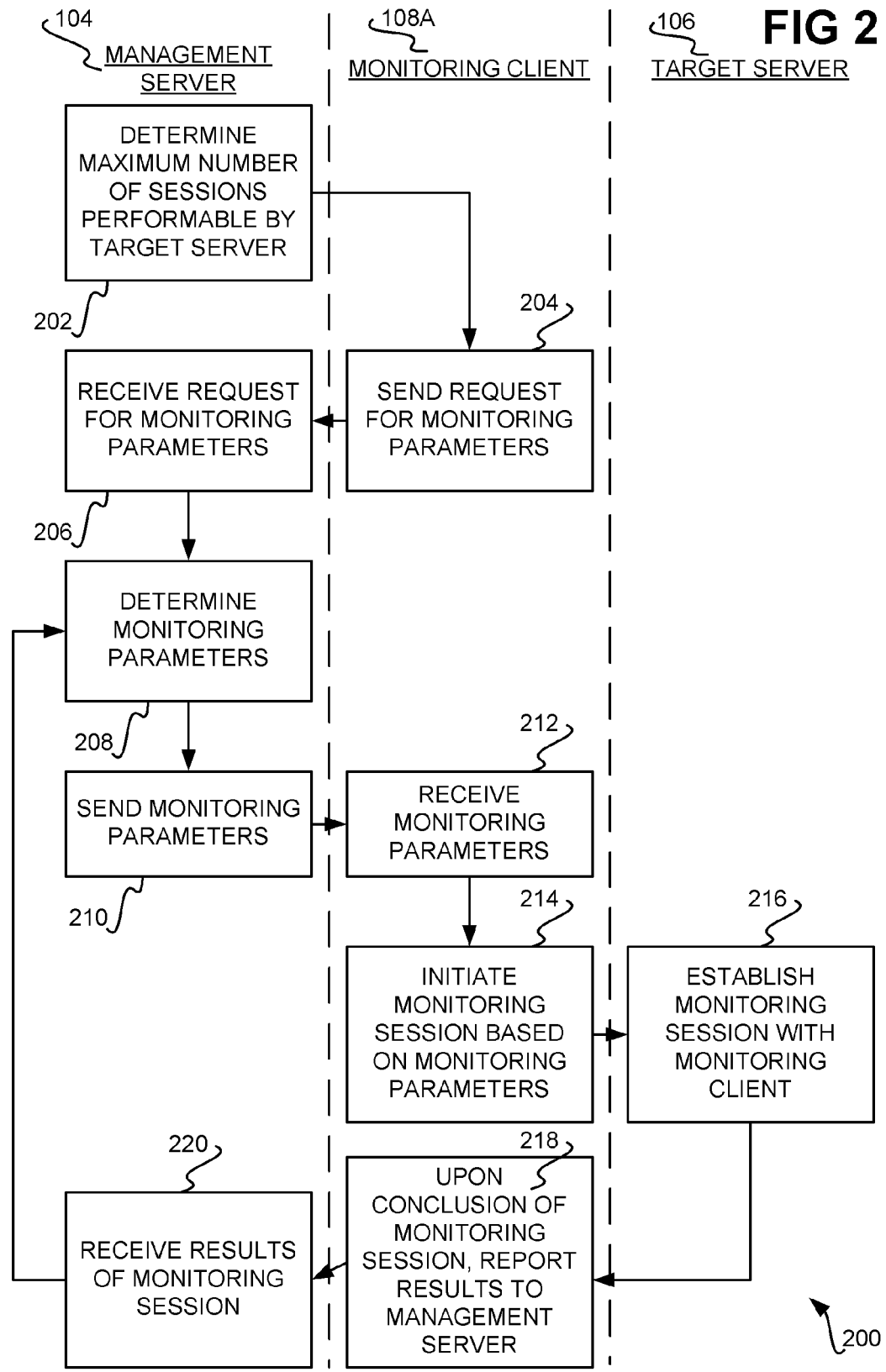
FIG. 2 is a flowchart of a method for managing monitoring, according to an embodiment of the invention.

FIG. 2 shows a method 200, according to an embodiment of the invention. The method 200 is divided into columns, such that different parts of the method 200 are performed by the monitoring management server 104, the monitoring target server 106, and (representatively) the monitoring client 108A. The method 200 presumes that the monitoring client 108A has already received the middleware 110A from the monitoring management server 104 and has installed the middleware 110A thereat.

The management server 104 determines the maximum number of monitoring sessions that can be performed by the target server 106 (202). This may be the maximum number of sessions that the target server 106 can handle without impeding monitoring performance by the server 106. In one embodiment, the management server 104 permits a user, such as an administrator, to specify this number.

The monitoring client 108A at some point sends a request to the management server 104 for monitoring parameters (204). These parameters can include the start and stop times of the monitoring session, the network address of the target server 106, and the type of monitoring to be performed. Monitoring in this instance means determining network performance, such as the performance of data communication between the monitoring client 108A and the monitoring target server 106 over the network 102. The client 108A may also provide the server 104 with its local time.

The management server 104 receives this request (206), and based thereon determines monitoring parameters (208). For instance, the management server 104 determines monitoring parameters such that the monitoring session initiated by the client 108A does not cause the target server 106 to exceed the predetermined maximum number of sessions. The management server 104 may adjust these monitoring parameters so that they are with respect to the local time reported by the client 108A, as has been described. The management server 104 sends the parameters to the client 108A (210), which receives the monitoring parameters (212).

Thereafter, in accordance with the monitoring parameters received, the monitoring client 108A initiates a monitoring session (214). Thus, a monitoring session is established between the target server 106 and the monitoring client 108A (216). Once the monitoring session has been concluded, the monitoring client 108A reports the results of the session to the management server 104 (218), which receives the results (220). The management server 104 may then repeat the method 200 at part 208.

More specifically, the monitoring management that has been described in relation to FIGS. 1 and 2 can be summarized as follows. First, the monitoring management server 104 determines the number of the clients 108 for which monitoring sessions with the monitoring target server 106 are permitted to be established for each of a number of periods of time. Besides the maximum number, a minimum number may also be determined. When the management server 104 sends monitoring parameters to one of the clients 108, it records which monitoring period the client will be using, and how many clients will be using that period as well.

Second, a client sends its local time when it accesses the management server 104. The server 104 determines the local time difference between the client and itself, and then applies the difference to time-related parameters of the monitoring parameters. Therefore, the client performs monitoring in accordance with its own local time.

Figure 3:
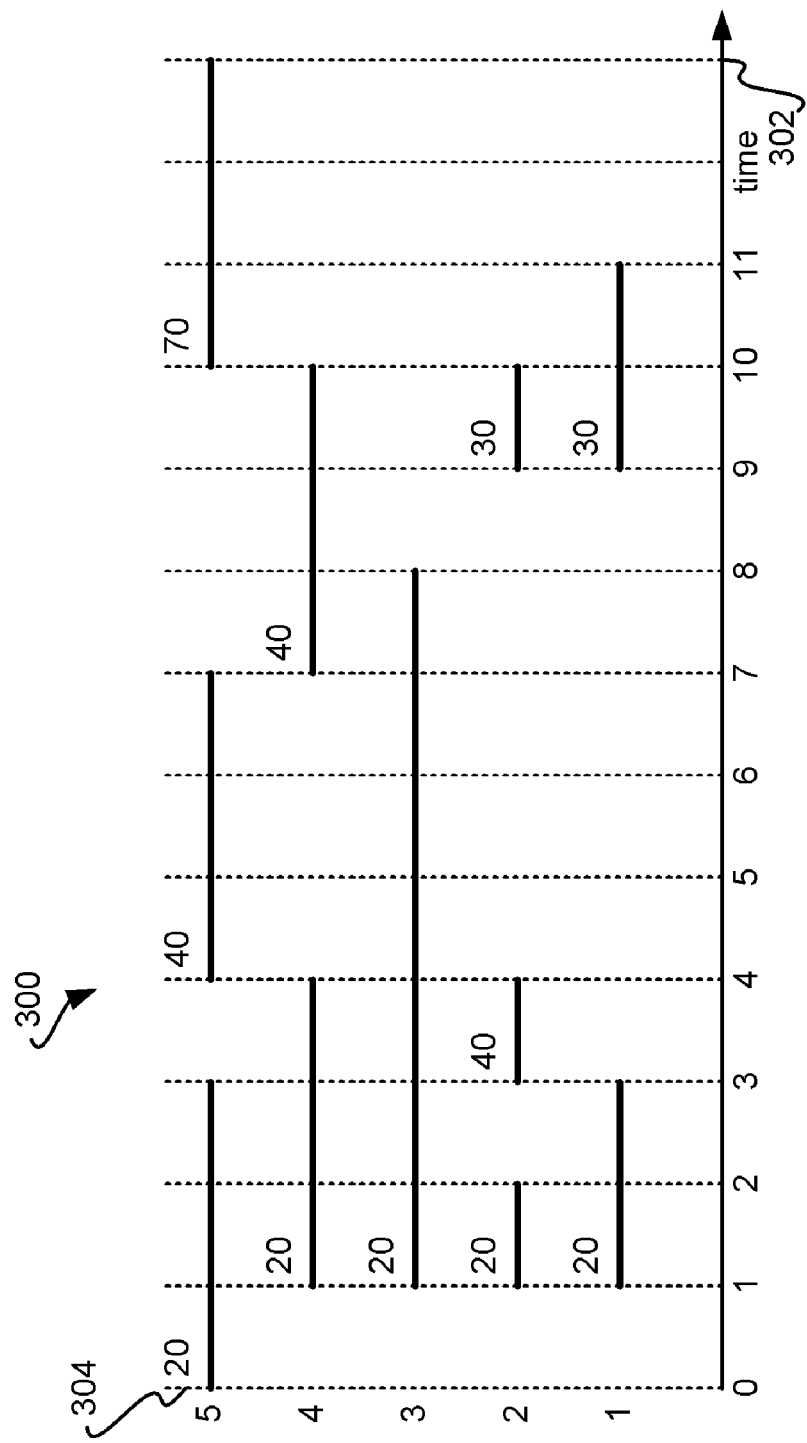
FIG. 3 is a diagram of a graph depicting representative performance of monitoring management, according to an embodiment of the invention.

FIG. 3 shows a graph 300 depicting representative performance of monitoring management, according to an embodiment of the invention. In the graph 300, the x-axis 302 specifies time periods 1 through 11, and the y-axis 304 specifies different types of monitoring 1 through 5. For each horizontal line, the number associated therewith indicates the number of client monitoring sessions that are to be established during the associated time periods. In the graph, it is presumed that the monitoring target server 106 is capable of handling up to 100 concurrent monitoring sessions during any given time period.

At time period 0, the management server 104 receives requests from 20 clients for type 1 monitoring, which requires three time periods to complete. Therefore, the management server 104 allocates 20 sessions to start at time period 0, and to end at time period 3. At time period 1, the management server 104 receives requests from 20 clients for type 4 monitoring, from 20 clients for type 3 monitoring, from 20 clients for type 2 monitoring, and from 20 clients for type 1 monitoring. Type 1, 2, 3, and 4 monitoring requires 2, 1, 7, and 3 time periods, respectively. The management server 104 allocates 20 sessions for each of these types, to start at time period 1, and to end at differing time periods as indicated in FIG. 3.

However, for sake of example, it is assumed that at time period 2 the management server 104 receives requests from 40 clients for type 2 monitoring. At time period 2, however, the target server 106 already has 80 concurrent sessions (of types 1, 3, 4, and 5), and cannot immediately permit these 40 clients to perform type 2 monitoring without the target server 106 exceeding its maximum number of 100 concurrent sessions. Therefore, the target server 106 provides monitoring parameters by which the 40 clients are to start monitoring of type 2 at time period 3. In this way, the management server 104 manages the monitoring so that the target server 106 does not handle more sessions that the maximum number of such sessions.

At time period 5, the management server 104 receives requests from 40 clients for type 5 monitoring, and is able to have these 40 clients immediately begin their monitoring sessions with the target server 106. Likewise, at time period 7, the management server 104 receives requests from 40 clients for type 4 monitoring, and is able to have these forty clients immediately begin their monitoring sessions with the target server 106. At time period 8, then, the target server 106 has just 40 sessions running.

At time period 9, the management server 104 receives requests from 30 clients for type 2 monitoring, from 30 clients for type 1 monitoring, and from 70 clients for type 5 monitoring (the latter being presumed). The management server 104 is able to accommodate immediate initiation of the monitoring sessions from the 30 clients for type 2 monitoring and from the 30 clients for type 1 monitoring, since this means that the maximum total of 100 concurrent sessions will be established with the target server 106. However, the earliest at which the management server 104 can schedule the 70 clients for type 5 monitoring is at time period 10. That is, these 70 clients cannot begin their type 5 monitoring with the target server 106 at time period 9, because doing so would mean that the maximum number of sessions of 100 would be exceeded by the target server 106.

FIG. 4 shows a timing diagram 400 illustratively depicting how the monitoring management server 104 manages the time difference between its local cock and the local clock of the monitoring client 108A, according to an embodiment of the invention. The arrow 402 represents time at the client 108A, whereas the arrow 404 represents time at the management server 104. In FIG. 4, s1 represents a lag between the local clock of the client 108A and an accurate absolute time, whereas s2 represents a lag between the local clock of the management server 104 and the accurate absolute time. Time T1 is the absolute time just before the client 108A sends a request to the server 104, and time T2 is the absolute time just after the server 104 has received the request. Time t1 is the local clock time of the client 108A when the absolute time is T1, and time t2 is the local clock time of the server 104 when the absolute time is T2.

At time T1, then, the monitoring client 108A requests monitoring parameters from the monitoring management server 104, where client local time t1 is equal to T1 plus s1. At time T2, the management server 104 receives the request, where server local time t2 is equal to T2 plus s2. Thus, the time difference delta is t2 minus t1, or T2 minus T1 plus s2 minus s1. The management server 104 sends the monitoring parameters to the client 108A, to start a monitoring sessions at time T plus delta. The client 108A actually starts monitoring at time T plus delta plus s1, which is equal to T plus s2 plus T2 minus T1.

Now, if it is assumed that T2 minus T1 is the same for all the clients 108, then the monitoring start time of all the clients 108 is the same absolute time irrespective of s1, which is the time lag of each of the clients 108. In practical terms, T2 minus T1 is not the same, but the difference of a few hundreds of milliseconds among the clients 108, as a large estimate, does not affect performance. In any case, the approach outlined above is advantageous because it does not require separate synchronizations with a time server, such as via NTP or SNTP, as in the prior art.

Specific Embodiment

In this section of the detailed description, the monitoring management that has been described in the previous section of the detailed description is described in more detail, according to an embodiment of the invention. In this section of the detailed description, a scheduled monitoring session is referred to as an allocation. A time period is referred to as a segment.

Therefore, the problem of determining the number of allocations for a number of segments can be expressed as follows.
Problem P
Input:
A set of n pieces of segments: $I=\{I\_1, I\_2, \ldots, I\_n\}$
The upper bound of maximum number of allocations: U
The lower bound of number of allocations for segment $I\_j$: $L\_j$
In this expression, $I\_j=[l\_j, r\_j]$. That is, segment $I\_j$ includes the left edge $l\_j$ and does not include the right edge $r\_j$.

$l\_j, r\_j \in Z, l\_j < r\_j$ $U, L\_j \in Z+$

It is further noted that for a segment $I\_j$ for which the lower bound is not set, it is assumed that $L\_j=0$. That is, besides there being a maximum number of allocations per segment (i.e., the upper bound), there can in some embodiments be a minimum number of allocations per segment (i.e., the lower bound).
Output:
Allocation f: $I \rightarrow Z+$
However, $\forall t \in Z+ \Sigma f(I\_k) <= U$
It is noted that the sum total $\Sigma$ is taken for all $I\_k$ where $l\_k <= t < r\_k$ (in other words, all segments including time t).

$\forall j \in \{1, \ldots n\} f(I\_j) >= L\_j$

Next, a data structure Interval to denote a segment can be defined as follows.

```
struct Interval {
    int in;                      //the left edge of a segment (inclusive)
    int out;                     //the right edge of a segment (exclusive)
    int allocNum;                //number of allocations for a segment
    int lowBoundOfAllocNum;      //the lower bound of the number of allocations for a
                                 //segment
    int usedNum;                 //number of client PCs actually used for monitoring
                                 //among above allocNum
    string progName;             //monitoring program name
};
```

A data structure Edge that represents a value of a segment edge can be defined as follows.

```
struct Edge {
    Edge(Interval* iv, bool b) : interval(iv), isIn(b) { }
    Interval* interval;                    //pointer to a segment
    bool isIn;                             //represents the right edge
                                           // (true) or left edge (false).
    bool operator<(const Edge& o) const {  //determines an order when
                                           // Edges are sorted.
        int a = getValue( );
        int b = o.getValue( );
        if (a != b) return (a < b);
        if (isIn != o.isIn) return (!isIn); //if the values are the same,
```

```
                                                    // the left edge is prior to
                                                    the right edge.
        return false;
    }
    int getValue( ) const {return isIn ? interval->in : interval->out;}
};
```

A data structure Overlap that represents a set of segments that have a common overlap can be defined as follows.

```
struct Overlap {
    Overlap(set<Interval*>& ivs, int r, int t) : intervals(ivs),
    reserved(r), time(t) { }
    bool operator<(const Overlap& o) const {
        int diff = reserved – o.reserved;
        if (diff != 0) return diff > 0;
```

```
        return time < o.time;
    }
    set<Interval*> intervals;
    int reserved;
    int time;
};
```

Using the above, then, a function calculate_allocations_number can determine the number of allocations for each segment, when a set of segments and the maximum number of allocations are given. A set of segment data is put into the form of a linked list of the Interval class. The lower bound of the number of allocations is put in lowBoundOfAllocNum each, which is a member variable of the Interval object of each element of the linked list. The upper bound of the maximum number of allocations is stored in allocNum, which is a member variable of the Interval object of each element of the linked list.

```
void calculate_allocation_number(list<Interval>& il, int upBoundOfAllocNum)
{
    //put the values of the left and right edges of a segment in es and sort them by ascending
order
    vector<Edge> es;
    for (list<Interval>::iterator p = il.begin( ), p_end = il.end( ); p != p_end; ++p) {
        Interval& iv = *p;
        Edge in(&iv, true);
        Edge out(&iv, false);
        es.push_back(in);
        es.push_back(out);
    }
    std::sort(es.begin( ), es.end( ));
    set<Overlap> overlaps;
    set<Interval*> oi;
    int reserved = 0;
    bool isPrevIn = false;
    for (vector<Edge>::iterator p = es.begin( ); p != es.end( ); ++p) {
        Edge& e = *p;
        Interval* iv = e.interval;
        if (e.isIn) { // IN
            oi.insert(iv);
            reserved += iv->lowBoundOfAllocNum;
            isPrevIn = true;
        } else { //OUT
            if (isPrevIn)
                overlaps.insert(Overlap(oi, reserved, e.getValue( )));
            oi.erase(iv);
            reserved -= iv->lowBoundOfAllocNum;
            isPrevIn = false;
        }
    }
    for (set<Overlap>::iterator p = overlaps.begin( ); p != overlaps.end( ); ++p) {
        const Overlap& ol = *p;
        int remain = upBoundOfAllocNum;
        int numUndetermined = 0;
        for (set<Interval*>::iterator q = ol.intervals.begin( ); q != ol.intervals.end( ); ++q) {
            Interval* iv = *q;
            if (iv->allocNum > 0)
                remain -= iv->allocNum;
            else {
                remain -= iv->lowBoundOfAllocNum;
                ++numUndetermined;
            }
        }
        if (numUndetermined == 0) continue;
        int additAllocNum = remain / numUndetermined;
        int cntAllocNum = remain % numUndetermined;
        for (set<Interval*>::iterator q = ol.intervals.begin( ); q != ol.intervals.end( ); ++q) {
            Interval* iv = *q;
            if (iv->allocNum == 0) {
                iv->allocNum = iv->lowBoundOfAllocNum + additAllocNum;
                if (cntAllocNum-- > 0)
                    ++iv->allocNum;
            }
```

-continued

```
    }
  }
}
```

It is noted that the length of time it takes for the above algorithm is O(n^2) for n segments. A solution obtained by this algorithm has the following properties. First, it has fairness, in that the distribution of the number of allocations is always fair where possible. Second, it has maximality, in that the sum total of the number of allocations is a maximum as to any addition to the number of allocations. The former property means that where there are m segments that have common overlapping periods with one another, and where there are is no overlap with other segments (and where the lower bound is zero), the number of allocations for such m segments are equally distributed. The latter property means that for obtained solution, if the number of allocations for any segment is increased by even one, the upper bound is exceeded.

It is noted that the number of allocations found via this approach presumes that the load on the monitoring target server 106 is uniform for all types of monitoring. In at least some situations, however, this is not the case. For example, monitoring of type A may have a load a, and monitoring of type B may have a load b. The ratio of b to a is thus used to equate monitoring of type B to that of type a, by multiplying the resulting allocations for type B by one over this ratio.

Finally, a function respond_to_client, to determine which monitoring parameters are sent by the management server 104 to a client can be as follows.

```
void respond_to_client(multimap<int, Interval*>& bt, int start, int end)
{
//find a segment that has the smallest start time from among after start.
multimap<int, Interval*>::iterator p = bt.lower_bound(start);
    if (p == bt.end( )) return;
    Interval* i = p->second;
    if (i->in >= end) return;
    list<Interval*> il; //a set of Interval objects that are replied as
    monitoring parameters
    il.push_back(i);
    if (++i->usedNum == i->allocNum) bt.erase(p);
    //add all segments, which do not overlap with the segment found first,
    to il
for (p = bt.lower_bound(i->out); p != bt.end( );) {
    i = p->second;
      if (i->in >= end) break;
      il.push_back(i);
      if (++i->usedNum == i->allocNum) {
        bt.erase(p++);
      } else {
        ++p;
      }
   }
//create the monitoring parameters based on each Interval object in il and
return (reply) them to the client
    reply_with_parameter(il);
}
```

The respond_to_client function operates in response to a client sending a request to the management server 104.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:
1. A system comprising:
a monitoring management server to determine monitoring parameters for each of one or more monitoring clients, the monitoring parameters specifying at least when a monitoring client is to begin a monitoring session with a monitoring target server and when the monitoring client is to end the monitoring session with the monitoring target server,
the monitoring management server determining the monitoring parameters for each monitoring client such that a predetermined maximum number of monitoring sessions performed within each of a plurality of time periods is never exceeded by the monitoring target server;
the monitoring target server having the predetermined maximum number of monitoring sessions that can performed between the one or more monitoring clients and the monitoring target server in each of a plurality of time periods; and,
the one or more monitoring clients, each monitoring client to receive monitoring parameters from the monitoring management server in response to a request initiated by the monitoring client, to initiate a monitoring session with the monitoring target server in accordance with the monitoring parameters, and to report results of the monitoring session to the monitoring management server upon the monitoring session ending,
wherein each of the monitoring management server, the monitoring target server, and the one or more monitoring clients is a computing device connected to one another over a network,
wherein the monitoring session initiated between each monitoring client and the monitoring target server results in communication of data between the monitoring client and the monitoring target server, where the communication of data is measured for one or more of latency and throughput, where the one or more of latency and throughput are the results of the monitoring session,
wherein each monitoring client is to initiate the monitoring session directly with the monitoring target server, instead of initiating the monitoring session through the monitoring management server,
wherein the monitoring target server has no software installed thereon related to monitoring management functionality performed by the monitoring management server,
wherein the monitoring target server is unaware of the monitoring management server and is unaware that the monitoring management server is instructing the one or more monitoring clients when and for how long to establish monitoring sessions with the monitoring target server, whereas the monitoring management server is aware of the monitoring target server,
wherein a given monitoring client of the one or more monitoring clients is to send a first local time of the given monitoring client to the monitoring management server, the first local time being equal to a first absolute time plus a first lag between the first local time and the first absolute time, the first absolute time being a first value of an absolute time just before the given monitoring client sends the first local time to the monitoring management server;

wherein in response to the given monitoring client sending the first local time to the monitoring management server, the monitoring management server is to determine a delta equal to a second local time of the monitoring management server minus the first local time, the second local time being equal to a second absolute time plus a second lag between the second local time and the second absolute time, the second absolute time being a second value of the absolute time just after the monitoring management server receives the first local time from the given monitoring client, the delta being equal to the second absolute time minus the first absolute time plus the second lag minus the first lag;

the monitoring management server is to send a given time equal to the delta plus the absolute time to the given monitoring client, wherein in response to the given monitoring client receiving the given time from the monitoring management server, the given monitoring client is to start monitoring at the first lag plus the given time, the first lag plus the given time being equal to the absolute time plus the second lag plus a difference between the second value of the absolute time and the first value of the absolute time, and wherein the communication of data between the monitoring client and the monitoring target server comprises one or more of: first communication of data from the monitoring client and the monitoring target server and second communication of data from the monitoring target server to the monitoring client.

2. The system of claim 1, wherein the monitoring parameters further specify a type of a monitoring session to be performed between a monitoring client and the monitoring target server.

3. The system of claim 1, wherein the maximum number of monitoring sessions that can be performed between the one or more monitoring clients and the monitoring target server in each of the plurality of time periods relates to a threshold past which degradation of monitoring by the monitoring target server results.

4. The system of claim 1, wherein the monitoring management server is to permit an administrator to specify the predetermined maximum number of monitoring sessions performed within each of the plurality of time periods by the monitoring target server.

5. The system of claim 1, wherein the monitoring management server, in response to receiving a request from a monitoring client for monitoring parameters is to determine the monitoring parameters for the monitoring client such that the predetermined maximum number of monitoring sessions performed within each of the plurality of time periods by the monitoring target server is never exceeded.

6. The system of claim 1, wherein the monitoring target server is unaware that the monitoring management server is managing the monitoring sessions initiated with the monitoring target server by the monitoring clients.

7. The system of claim 1, wherein the monitoring target server has no software installed thereon related to monitoring management performed by the monitoring management server.

8. The system of claim 1, wherein the monitoring target server has no built-in load-distribution functionality in relation to the monitoring sessions initiated with the monitoring target server.

9. The system of claim 8, wherein the monitoring target server is unable to reject initiation of a monitoring session by a monitoring client.

10. The system of claim 1, wherein each of a plurality of times a monitoring client reports the results of a monitoring session to the monitoring management server upon the monitoring session ending, the monitoring client receives new monitoring parameters from the monitoring management server in accordance with which a new monitoring session is to be initiated by the monitoring client with the monitoring target server.

11. A method comprising:

requesting monitoring parameters, by a monitoring client from a monitoring management server, the monitoring parameters specifying at least when the monitoring client is to begin a monitoring session with a monitoring target server and when the monitoring client is to end the monitoring session with the monitoring target server;

receiving, by the monitoring client, the monitoring parameters from the monitoring management server; and, initiating, by the monitoring client, the monitoring session with the monitoring target server in accordance with the monitoring parameters, wherein each of the monitoring management server, the monitoring target server and the monitoring client is a computing device connected to one another over a network, wherein the monitoring session initiated between the monitoring client and the monitoring target server results in communication of data between the monitoring client and the monitoring target server, where the communication of data is measured for one or more of latency and throughput as the results of the monitoring session reported to the monitoring management server upon the monitoring session ending, wherein each monitoring client is to initiate the monitoring session directly with the monitoring target server, instead of initiating the monitoring session through the monitoring management server, wherein the monitoring target server has no software installed thereon related to monitoring management functionality performed by the monitoring management server, wherein the monitoring target server is unaware of the monitoring management server and is unaware that the monitoring management server is instructing the one or more monitoring clients when and for how long to establish monitoring sessions with the monitoring target server, whereas the monitoring management server is aware of the monitoring target server, wherein the monitoring client is to send a first local time of the monitoring client to the monitoring management server, the first local time being equal to a first absolute time plus a first lag between the first local time and the first absolute time, the first absolute time being a first value of an absolute time just before the monitoring client sends the first local time to the monitoring management server;

wherein in response to the monitoring client sending the first local time to the monitoring management server, the monitoring management server is to determine a delta equal to a second local time of the monitoring management server and the first local time, the second local time being equal to a second absolute time plus a second lag between the second local time and the second absolute time, the second absolute time being a second value of the absolute time just after the monitoring management server receives the first local time from the monitoring client, the delta being equal to the second absolute time minus the first absolute time plus the second lag minus the first lag;

the monitoring management server is to send a given time equal to the delta plus the absolute time to the monitoring client, wherein in response to the monitoring client receiving the given time from the monitoring management server, the monitoring client is to start monitoring at the first lag plus the given time, the first lag plus the given time being equal to the absolute time plus the second lag plus a difference between the second value of the absolute time and the first value of the absolute time.

12. The method of claim 11, further comprising reporting, by the monitoring client, results of the monitoring session to the monitoring management server.

13. The method of claim 12, further comprising, in response to the monitoring client reporting the results of the monitoring session to the monitoring management server:

receiving, by the monitoring client, new monitoring parameters from the monitoring management server; and, initiating the new monitoring session with the monitoring target server in accordance with the new monitoring parameters.

14. The method of claim 11, wherein the monitoring parameters further specify a type of a monitoring session to be performed between the monitoring client and the monitoring target server.

15. A method comprising:

determining, by a monitoring management server, a maximum number of monitoring sessions performable within each of a plurality of time periods by a monitoring target server;

receiving, by the monitoring management server, a request for monitoring parameters from a monitoring client in accordance with which the monitoring client is to initiate a monitoring session with the monitoring target server;

determining, by the monitoring management server, the monitoring parameters such that the maximum number of monitoring sessions performable within each of the plurality of time periods by the monitoring target server is not exceeded; and, sending, by the monitoring management server, the monitoring parameters to the monitoring client, wherein each of the monitoring management server, the monitoring target server and the monitoring client is a computing device connected to one another over a network, wherein the monitoring session initiated between the monitoring client and the monitoring target server results in communication of data between the monitoring client and the monitoring target server, where the communication of data is measured for one or more of latency and throughput as the results of the monitoring session reported to the monitoring management server upon the monitoring session ending, wherein each monitoring client is to initiate the monitoring session directly with the monitoring target server, instead of initiating the monitoring session through the monitoring management server, wherein the monitoring target server has no software installed thereon related to monitoring management functionality performed by the monitoring management server, wherein the monitoring target server is unaware of the monitoring management server and is unaware that the monitoring management server is instructing the one or more monitoring clients when and for how long to establish monitoring sessions with the monitoring target server, whereas the monitoring management server is aware of the monitoring target server, wherein the monitoring client is to send a first local time of the monitoring client to the monitoring management server, the first local time being equal to a first absolute time plus a first lag between the first local time and the first absolute time, the first absolute time being a first value of an absolute time just before the monitoring client sends the first local time to the monitoring management server;

wherein in response to the monitoring client sending the first local time to the monitoring management server, the monitoring management server is to determine a delta equal to a second local time of the monitoring management server and the first local time, the second local time being equal to a second absolute time plus a second lag between the second local time and the second absolute time, the second absolute time being a second value of the absolute time just after the monitoring management server receives the first local time from the monitoring client, the delta being equal to the second absolute time minus the first absolute time plus the second lag minus the first lag;

the monitoring management server is to send a given time equal to the delta plus the absolute time to the monitoring client, wherein in response to the monitoring client receiving the given time from the monitoring management server, the monitoring client is to start monitoring at the first lag plus the given time, the first lag plus the given time being equal to the absolute time plus the second lag plus a difference between the second value of the absolute time and the first value of the absolute time.

16. The method of claim 15, further comprising:

receiving, by the monitoring management server, results of the monitoring session from the monitoring client;

in response to the monitoring management server receiving the results of the monitoring session from the monitoring client, determining, by the monitoring management server, new monitoring parameters in accordance with which the monitoring client is to initiate a new monitoring session with the monitoring target server; and, the monitoring management server sending the monitoring parameters to the monitoring client.

17. The method of claim 15, wherein the monitoring parameters further specify a type of a monitoring session to be performed between the monitoring client and the monitoring target server.

* * * * *